United States Patent [19]
Galli

[11] Patent Number: 5,996,719
[45] Date of Patent: Dec. 7, 1999

[54] CONTROL SYSTEM FOR A SELECTABLE FOUR-WHEEL DRIVE TRANSMISSION

[75] Inventor: Maurizio Galli, Carpi, Italy

[73] Assignee: New Holland North America, Inc., New Holland, Pa.

[21] Appl. No.: 08/880,698

[22] Filed: Jun. 23, 1997

[30] Foreign Application Priority Data

Jul. 12, 1996 [IT] Italy .................................. TO96A0600

[51] Int. Cl.⁶ .................................................. B60K 17/34
[52] U.S. Cl. .......................................... 180/233; 180/248
[58] Field of Search .................................. 180/233, 248, 180/249

[56] References Cited

U.S. PATENT DOCUMENTS 4,605,084  8/1986  Haynes et al. .......................... 180/70.1
4,781,265  11/1988  Weiler et al. ........................... 180/233

*Primary Examiner*—Matthew C. Graham
*Assistant Examiner*—Daniel Yeagley
*Attorney, Agent, or Firm*—Larry W. Miller; J. William Stader; Frank A. Seemar

[57] ABSTRACT

A transmission is provided for a tractor having a rear permanently engaged drive axle and a front selectively engaged drive axle and includes a coupling for selectively applying torque to the front drive axle of the vehicle to switch between two wheel drive and four-wheel drive in dependence upon slipping of the wheels of the rear axle. The coupling includes first and second gears, arranged to rotate with the rear and front axles, respectively, and having teeth which mesh with one another, and a rotary fluid valve sensitive to the rear wheel slip dependent relative angular position of the first and second members for actuating a jacking device that is operative to enable and disable the transmission of drive torque through the coupling to the front axle.

19 Claims, 7 Drawing Sheets

CONTROL SYSTEM FOR A SELECTABLE FOUR-WHEEL DRIVE TRANSMISSION

BACKGROUND OF THE INVENTION

The present invention relates to a control system for automatically changing between two-wheel drive and four-wheel drive modes of operation in an off-road vehicle, such as an agricultural tractor.

In an agricultural tractor provided with a conventional clutch to engage four-wheel drive, when the clutch is engaged, the front wheels are normally driven by about 2% faster than the rear wheels. This speed differential is caused by the geometry of the transmission members fitted to the front wheels. In the field, that is when the tractor is travelling over agricultural ground, because of the low speed at which the tractor normally runs and because of the fact that the agricultural ground offers a low adhesion to the tires, it is established that with the four-wheel drive transmission engaged all the wheels may slip even by up to 10–15% with respect to the speed imposed by the engine of the tractor so that the difference in speed between the front wheels and the rear wheels is not noticed.

On metal ed road surfaces, however, because the tractor tends to be driven at higher speeds and because there is better adhesion between the tires and the road surface, there is a considerable slipping of the front wheels on the ground when four-wheel drive is engaged. The front wheels slip in preference to the rear wheels because in tractors most of the weight is supported by the rear wheels and the frictional force on the ground at the rear wheels is greater than at the front wheels.

Because the slipping of the front wheels on metalled road surfaces causes a high degree of wear on the front tires, it is preferred to disengage the clutch and revert to two-wheel drive when driving on good road surfaces.

Furthermore, on bends, especially on those of a short radius, two-wheel drive is preferred to four-wheel drive because even when the front axle differential is not locked, the front wheel on the outside of the bend tends to travel up to 20% faster than the rear wheels so that, if four-wheel drive would be engaged, this front wheel would slip, again causing considerable wear on the tire.

For these reasons, it is desirable in a tractor to be able to select between two-wheel and four--wheel drive in dependence upon the road surface on which the tractor is driven. Ideally, the tractor should have four-wheel drive engaged only under poor road adhesion conditions when the rear wheels slip with respect to the ground.

In the prior art, it is known to provide a transmission in which two-wheel and four-wheel drive can be selected by the operator of the tractor, but this requires the operator to have the skill to know when to change between four-wheel and two--wheel drive for the best traction and minimum tire wear.

To simplify the task of the operator, it has already been proposed to provide a transmission with a control system that can automatically select four-wheel drive, whenever required to reduce slipping of the rear wheels.

The Applicants' European Patent EP-A-0.432.549 which is believed to represent the closest prior art to the present invention, discloses a control system for automatically engaging four-wheel drive in a vehicle transmission. The transmission comprises a first drive shaft for transmitting drive from the engine to two rear wheels and a second drive shaft for transmitting drive to two front wheels. A clutch acts, when engaged, to couple the two drive shafts for rotation with one another and the drive transmission geometry is such that, with the clutch engaged, the transmission causes the said front wheels to be driven slightly slower than the rear wheels. In the second drive shaft, a special coupling is provided which comprises toothed drive and driven members that mesh with one another with lost motion, that is to say, the two members can rotate one relative to the other through a limited angle. Relative rotation of the drive and driven members of the coupling is sensed by an element adapted to move axially between two end positions as the lost motion in the coupling is taken up to indicate the direction in which torque is being transmitted through the coupling. A sensor detects the end positions of the latter element and generates an electrical signal that is used by an electronic processing unit to control engagement or disengagement of the clutch.

The principle on which the above proposal is based is that, when the rear wheels slip in two-wheel drive, the drive member of the lost motion coupling will try to rotate faster than the driven member, the speed of the latter corresponding to the road speed of the vehicle. When on the other hand four-wheel drive is engaged and the wheels are not slipping on the ground, then the front wheels will try to roll on the ground faster than the speed at which they are being driven by the transmission with the result that the driven member will try to rotate faster than the drive member and will apply a reverse torque to the engine through the lost motion coupling. During the reversal of the direction of the torque through the coupling, the backlash or lost motion in the coupling is taken up resulting in an angular relative displacement between the drive and the driven members which is translated into an axial displacement of the sensor element. As already mentioned, in response to the movement of the sensor element in the one or other direction, the electronic processing unit controls the four-wheel drive clutch to either engage or to disengage.

Although the above arrangement has proven to be extremely efficient in practice, it nevertheless suffers from the disadvantage that, apart from the four-wheel drive clutch, a separate lost motion coupling with additional sensor controlling an electronic processing unit is needed to automatically switch between two-wheel drive and four-wheel drive. It will be appreciated that this is not cost-effective and complicates the assembly of the parts and the calibration of the arrangement.

SUMMARY OF THE INVENTION

It is therefore an object of the present invention to provide a coupling which operates on the same principle as described above but which incorporates the function of the four-wheel drive clutch without requiring any additional sensor or processing unit to control the switching between two-wheel and four-wheel drive modes.

According to the present invention a transmission for a vehicle is provided having a first permanently engaged axle and a second selectively engaged axle, the transmission comprising a coupling for selectively applying torque to the second axle of the vehicle to switch between two-wheel drive and four-wheel drive in dependence upon slipping of the wheels connected to the first axle, which coupling comprises a first member and a second member arranged to rotate with the first and second axle, respectively, the first and second members having teeth which selectively mesh with one another.

The transmission is characterized in that the second member is defined by a rotary fluid valve, the position of which is sensitive to slip of the wheels connected to the first axle, and a jacking mechanism operative to enable and disable the transmission of drive torque through the coupling by respectively engaging and disengaging the teeth, the fluid valve controlling the operation of said jacking mechanism.

The first transmission member is a drive member rotatable with the rear wheels of the vehicle, while the second member is rotatably driven with the front wheels.

Preferably, the rotary fluid valve includes a collar interposed between the driven member and a driven shaft connected to the front axle of the vehicle. The driven member is fast in rotation with and axially slidable relative to the collar whereas the collar is axially fast with the driven shaft but rotatable relative thereto through a limited angle. A friction ring is provided for applying frictional drive between the drive member and the collar. Supply and return fluid passages pass through the driven shaft and ports are provided in the collar which align with the passages in the driven shaft only in predetermined angular positions of the collar relative to the driven shaft to establish fluid communication between the jacking means and the supply or return fluid passage in the driven shaft. The jacking means are constituted by a pressure chamber defined between the driven member and the collar.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 1:
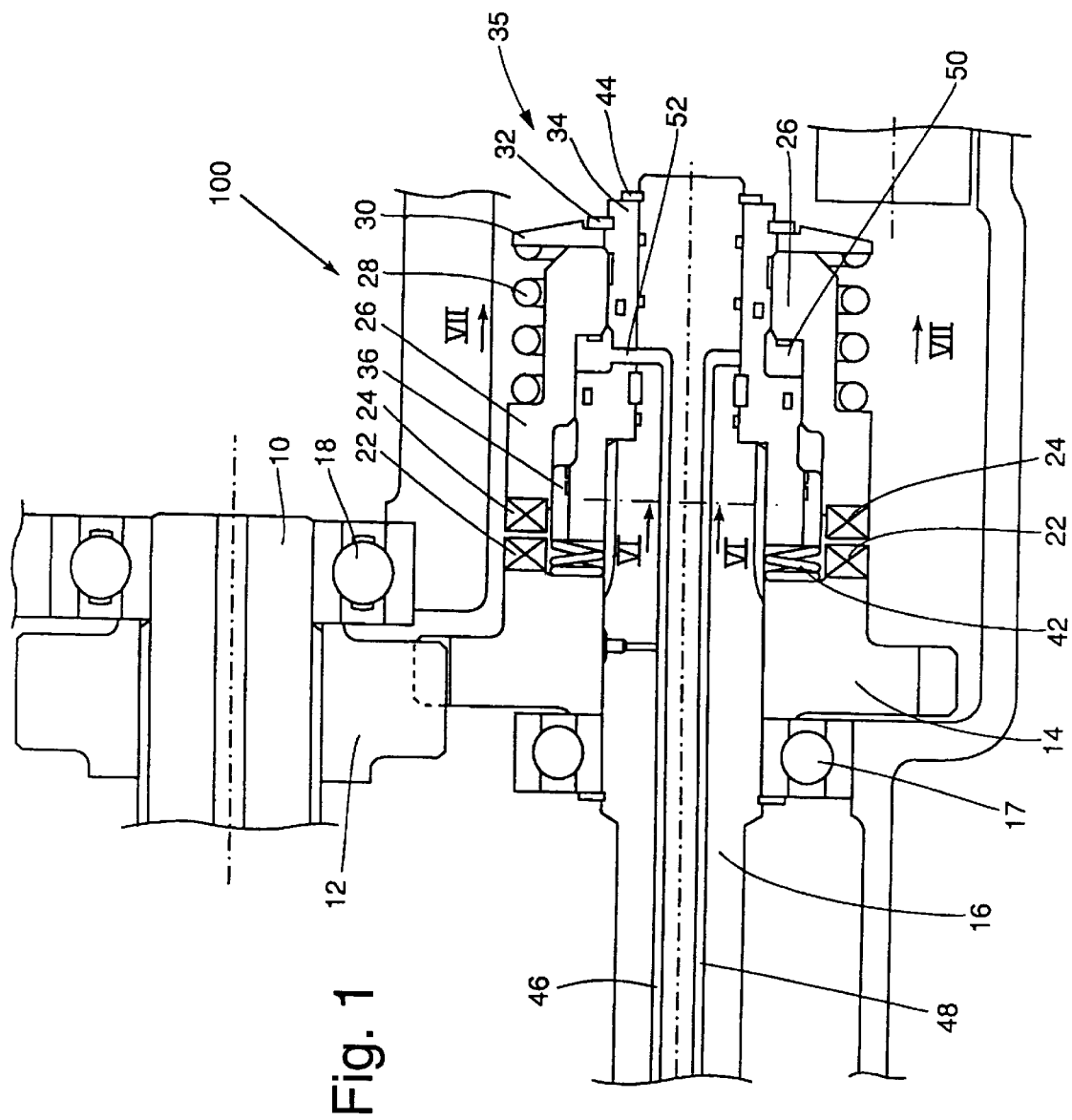
FIG. 1 is a section through a coupling that forms part of a transmission constructed in accordance with the invention.
Figure 2:
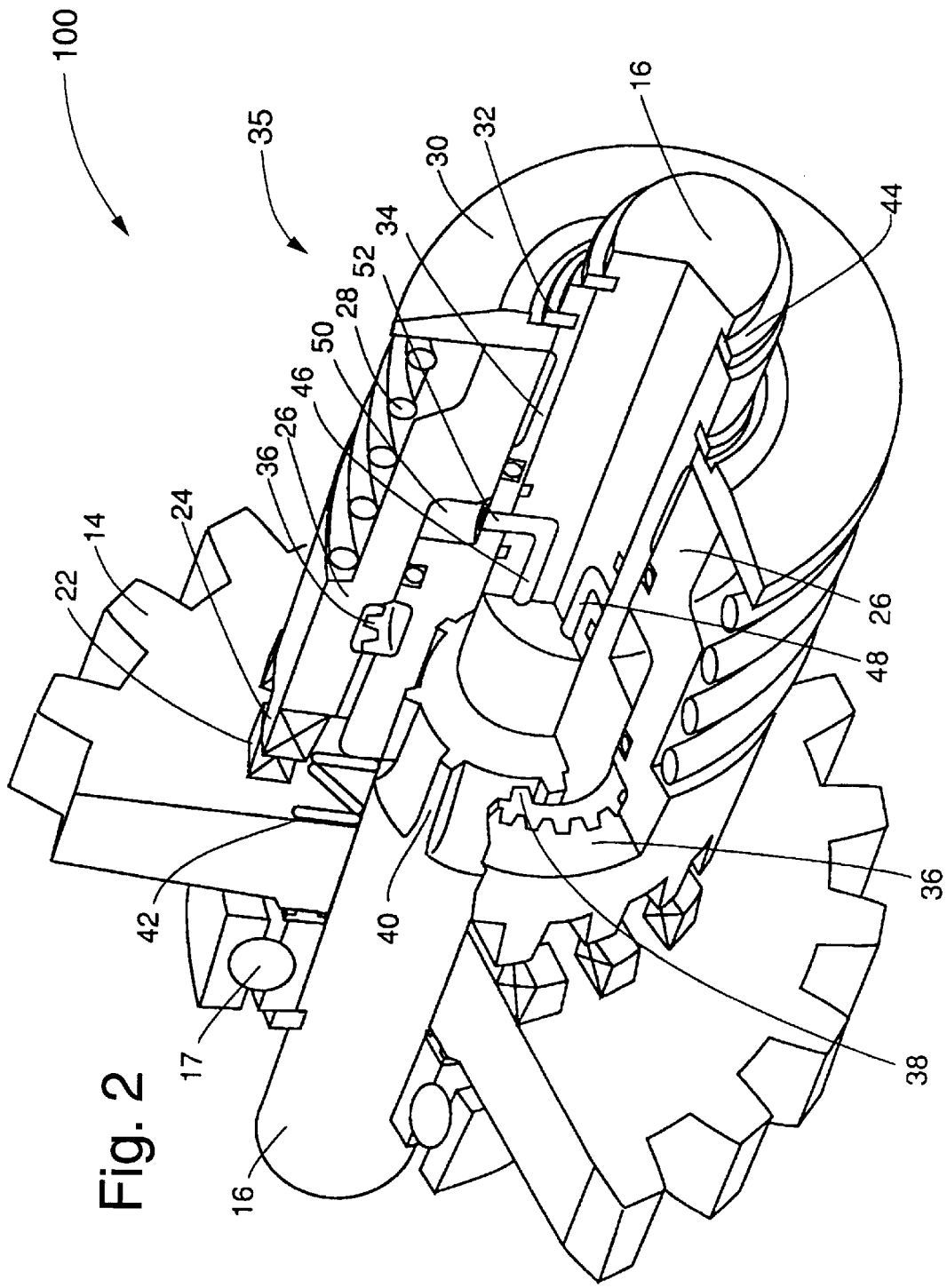
FIG. 2 shows a partly cut-away perspective view of the coupling shown in FIG. 1.
Figure 8:
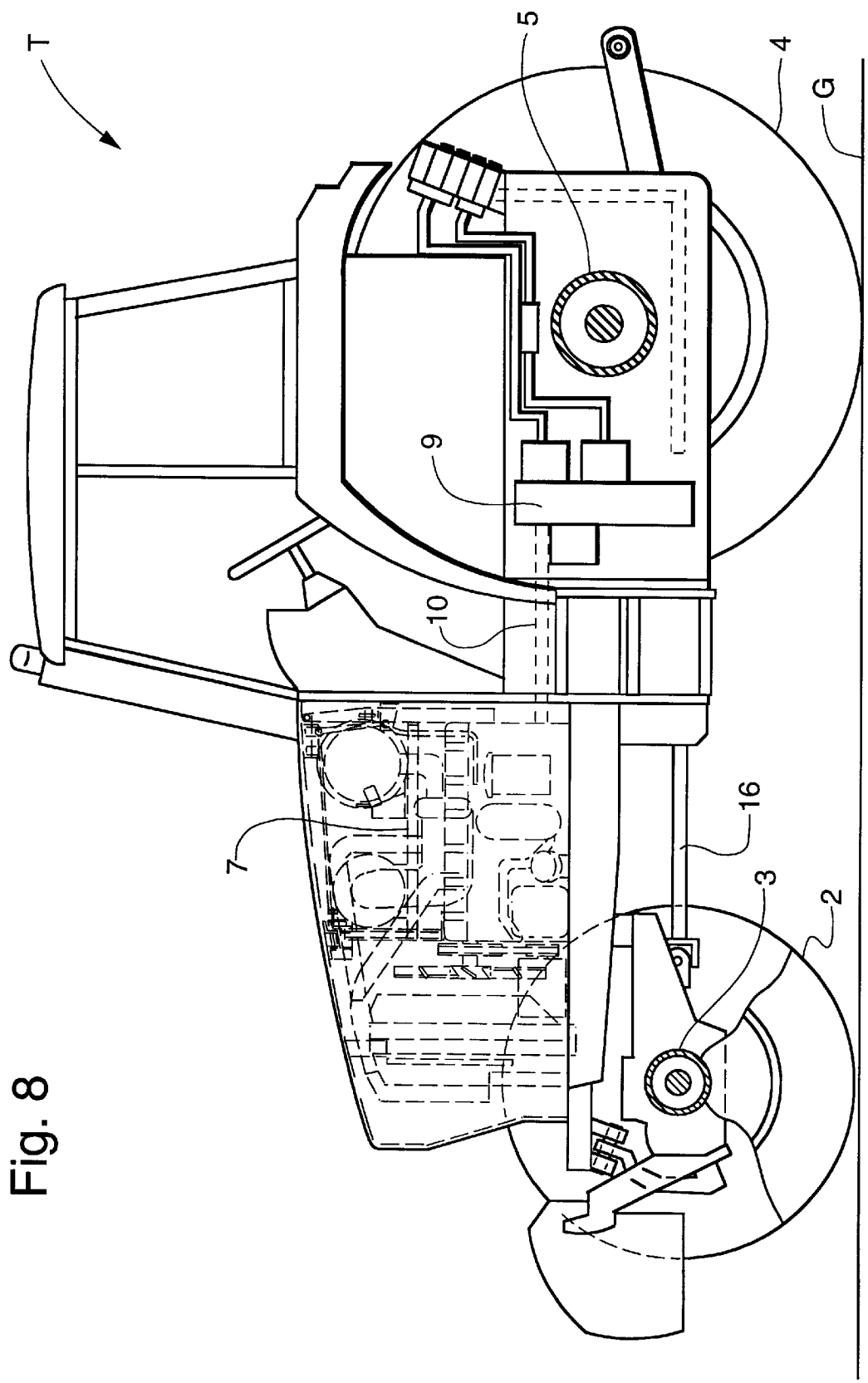
FIG. 8 is a side elevational view of a representative tractor in which the coupling depicted in FIGS. 1 and 2 is typically utilized.

Referring first to FIGS. 1, 2 and 8, a tractor T incorporating the principles of the instant invention is best seen. The tractor T is supported above the ground G by front wheels 2 mounted on a front axle 3 and by rear wheels 4 mounted on a rear axle 5. An engine 7 provides operative power for the tractor T and is drivingly connected in a generally conventional manner to the rear axle 5 through a transmission 9. A drive shaft 10, best seen in FIG. 1, is driven by the engine 7 of the tractor T through a variable ratio gearbox or transmission 9 and is connected to drive the rear axle 5 of the tractor T. The drive shaft 10 is journalled in a bearing 18 for rotation within the transmission housing. The gearbox 7 driving the shaft 10 is not shown in detail in the drawing as it is not material to the present invention.

A driven shaft 16, journalled in a bearing 17, transmits torque to the front axle 3 of the tractor T and may be selectively coupled to and disconnected from the shaft 10 by a coupling that is generally designated 100. When the coupling 100 is engaged, all four-wheels 2,4 of the tractor T are driven whereas when it is disengaged, only the rear wheels 4 are driven.

The detailed construction of the coupling 100 will be better understood from the partly cut-away perspective view of the coupling shown in FIG. 2. A gear 12 (shown only in FIG. 1) mounted fast in rotation with the drive shaft 10 meshes with a gear 14 acting as the drive member of the coupling 100. The gear 14 is freely rotatable about the driven shaft 16 and has axially projecting dog teeth 22. A driven member 26 can slide axially relative to the driven shaft 16 and has teeth 24 that project axially towards the teeth 22 of the gear 14. When the driven member 26 is in the right hand end position illustrated in FIGS. 1 and 2, the teeth 22 and 24 are disengaged from one another. On the other hand, when the driven member is in its left hand end position, then the teeth 22 and 24 engage to transmit torque from the gear 14 to the driven member 26. When the dog teeth are in mesh with one another, there might be a significant intentional free play between the two sets of teeth allowing the driven member 26 a limited degree of rotation relative to the gear 14, avoiding any adherence of the teeth 22 and 24 to each other and enabling a smoother engagement. However, this free play is not compulsory and by providing the teeth 22 and 24 with conical engagement surfaces, a smooth engagement also would be ensured.

A collar 34 is interposed between the driven member 26 and the driven shaft 16. The collar 34 is connected by splines 36 to the driven member 26 so that the driven member 26 may slide axially over the collar 34 but may not rotate relative to it. The collar 34 has inwardly directed teeth 38 that mesh with clearance with teeth 40 on the driven shaft 16. The collar 34 is frictionally driven by the gear 14 through a friction ring constructed as a spring 42 that acts as a slipping clutch urging the collar to the right as viewed in the drawings against a circlip 44.

An annular working chamber 50 serves as a jacking means and is defined between two shoulders on the collar 34 and the driven member 26, respectively. The working chamber 50 is sealed by means of two O-rings that are located in annular recesses in the collar 34. A spring 28 surrounding the driven member 26 acts between a shoulder on the driven member 26 and an abutment plate 30 that is prevented from moving relative to the collar 34 by means of a circlip 32. The spring 28 biases the driven member 26 towards the left hand end position in which the teeth 22 and 24 mesh with one another and the volume of the working chamber 50 is at its minimum.

Two passages 46, 48 are formed in the driven shaft and are individually connectible to the working chamber 50 through ports 52 formed in the collar 34. When the free play between the teeth 38 and 40 is taken up in one direction of rotation, then the working chamber 50 is connected to the first passage 46. On the other hand, when the free play is taken up in the other direction of rotation then the working chamber 50 is connected to the second passage 48.

Figure 6A:
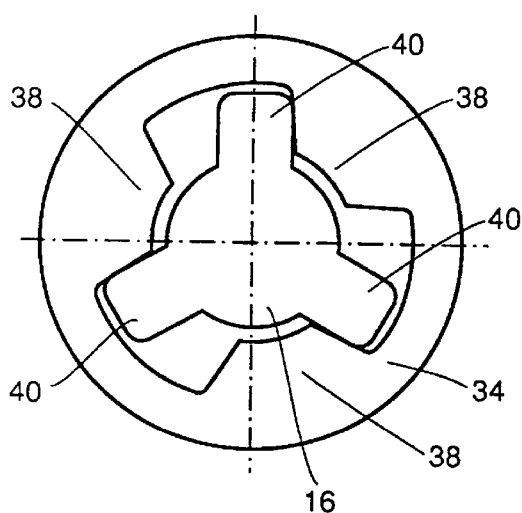
FIG. 6A is a sectional view taken along line VI—VI in FIG. 1.
Figure 7A:
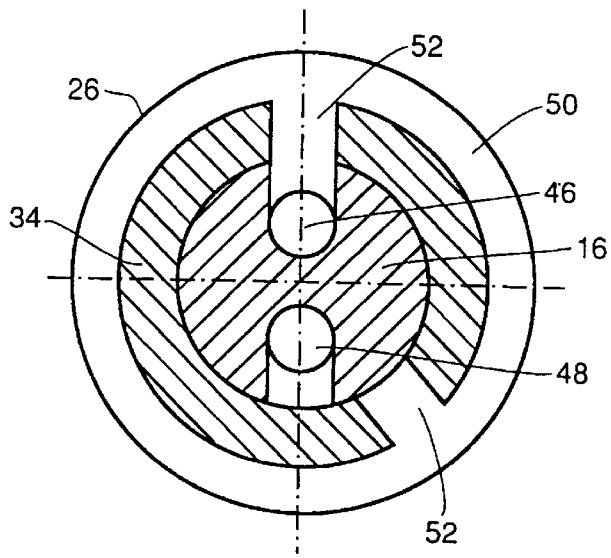
FIG. 7A is a sectional view taken along line VII—VII in FIG. 1.

This is more clearly visualized in FIGS. 6A, 6B and 7A, 7B. For ease of understanding, in FIGS. 6A and 6B only three teeth 38 and 40 are shown. It will be appreciated however that a larger number of teeth may be provided, such as shown in FIG. 2, the only requirement being that there is enough free play inbetween the corresponding teeth 38 and 40 to enable a lost motion to occur. Supposing as an example that in FIG. 6A the arrangement is rotating in a clockwise direction, corresponding to the forward drive of the tractor, then the driven shaft 16 is attempting to rotate faster than the collar 34 whereby the clockwise surfaces of the teeth 40 engage the anti-clockwise surfaces of the teeth 38. This is the condition when no slip of the wheels is experienced. In this position, as best seen in FIG. 7A, the first passage 46 is connected to the working chamber 50 through one of the ports 52 while the second passage 48 is disconnected from said chamber 50 in as much as the other port 52 is angularly offset from the passage 48.

Figure 6B:
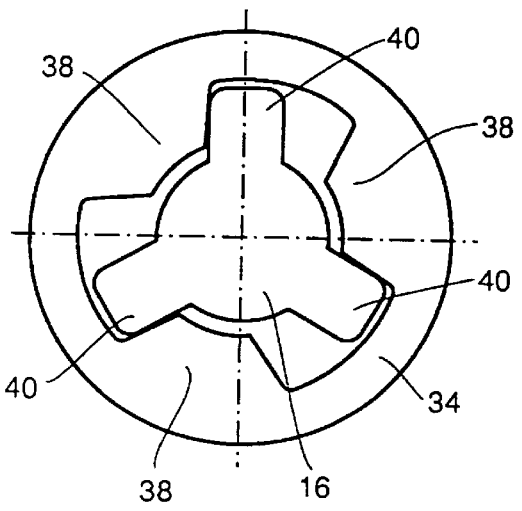
FIG. 6B is a view similar to FIG. 6A but showing the components in a different relative position.
Figure 7B:
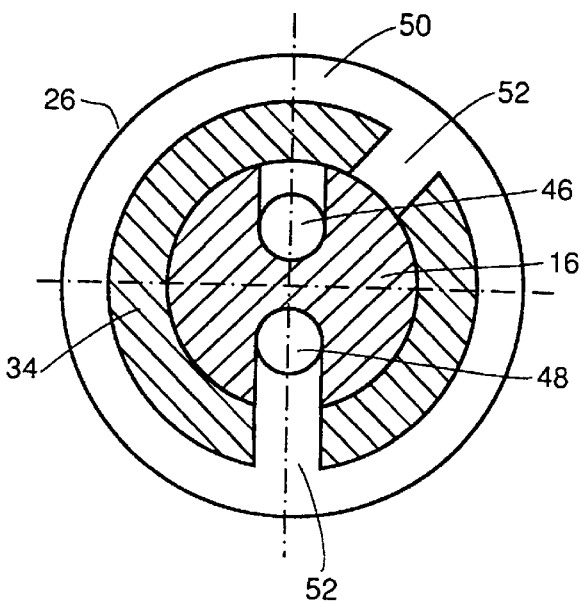
FIG. 7B is a view similar to FIG. 7A but showing the components in a different relative position.

In contrast therewith, again considering in FIG. 6B that the arrangement is rotating in the clockwise direction, the collar 34 is positively driving the driven shaft 16 whereby the clockwise surfaces of the teeth 38 abut the anti-clockwise surfaces of the teeth 40. The collar 34 and driven shaft 16 take the foregoing relative position when the rear wheels slip relative to the front wheels. With reference to FIG. 7B, it is seen that under this condition the second passage 48 and the chamber 50 are connected to each other due to one of the ports 52 having angularly shifted in line with the outlet of the passage 48. The first passage 46 on the other hand has lost its connection with the chamber 50 as a result of the other port 52 having shifted out of line with the outlet of the passage 46.

The circuit supplying hydraulic fluid to the working chamber 50 by way of the passages 46 and 48 and the rotary valve 35 constituted by the collar 34 is shown schematically under different conditions in FIGS. 3A to 5B. The circuit comprises a pump 110 that draws fluid from a reservoir 112 and supplies it by way of a pressure regulating valve 114 (e.g. set at a maximum pressure of 16 bar), to a three position, four port solenoid operated valve 116. A second inlet of the valve 116 is connected to the reservoir or drain 112. The outlet ports of the valve 116 are connected to the two passages 46 and 48, respectively, that lead to the working chamber 50 by way of the ports 52 controlled by the rotary valve 35.

The solenoids of the valve 116 are supplied with current by an electrical circuit that comprises a battery 104 and a switch 106 that is manually operated to select permanently engaged four-wheel drive (when the switch is open) or automatic mode selection (when the switch is closed). A further switch 109 what is closed when the forward-reverse lever 102 is in its reverse position operates a four pole two position relay the switching contacts of which are arranged in series with the switch 106 in the line supplying power to the solenoids of the valve 116. When the switch 106 is open, the solenoid valve takes up the central position shown in FIGS. 3A and 3B in which both the passages 46 and 48 are connected to the drain 112. When the switch 106 is closed, the position of the solenoid valve will depend on the position of the lever 102. If the lever 102 is in the forward drive position, then the solenoid valve takes up the position shown in FIGS. 4A and 5A in which the passage 48 is connected to the pressure regulator 114 and the passage 46 is connected to drain. Conversely, if the lever 102 is in the reverse drive position, then the solenoid valve takes up the position shown in FIGS. 4B and 5B in which the passage 46 is connected to the pressure regulator 114 and the passage 48 is connected to drain.

Figure 3A:
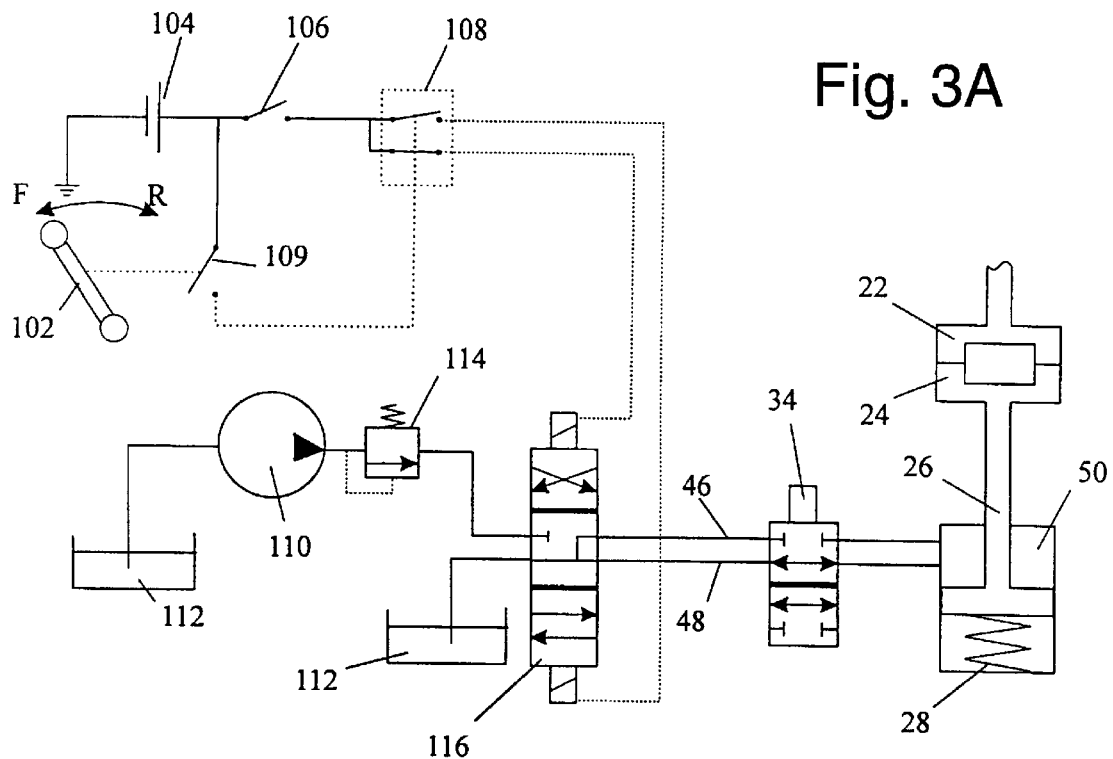
FIG. 3A shows the hydraulic circuit of the coupling in FIGS. 1 and 2 in which the components of the circuit are shown in the condition when four-wheel drive is permanently engaged and the vehicle is moving forwards.
Figure 3B:
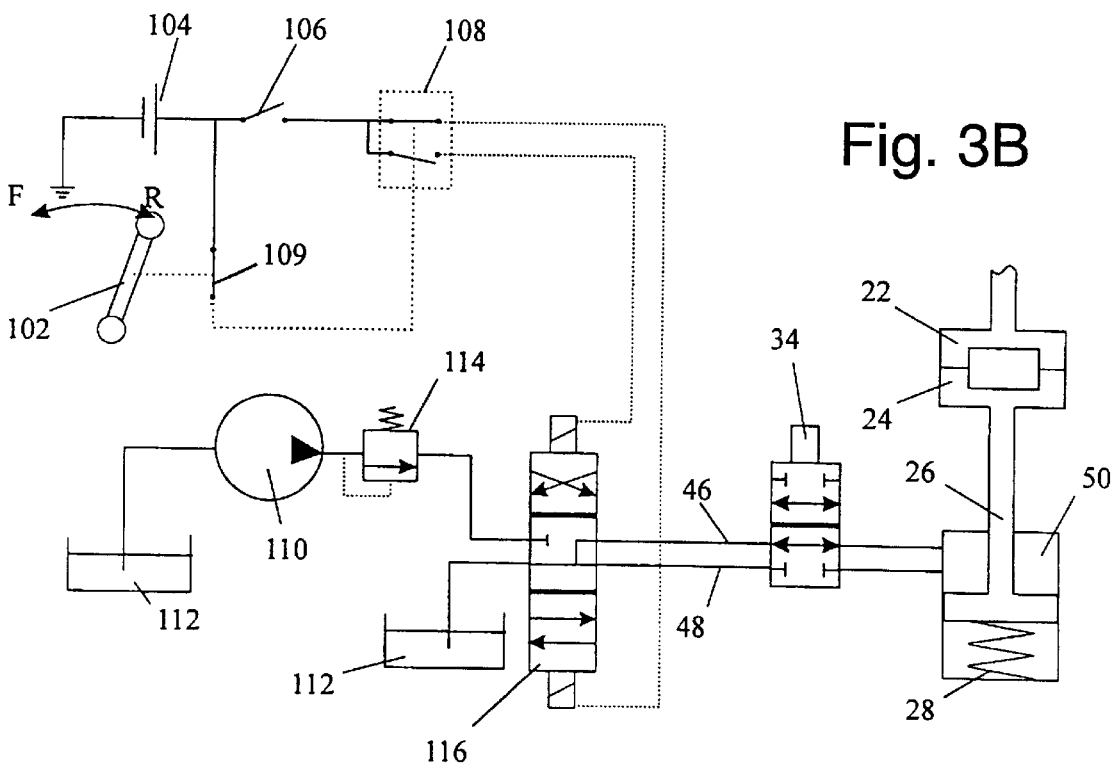
FIG. 3B shows the same hydraulic circuit with the components in the condition when four-wheel drive is permanently engaged and the vehicle is moving in reverse.

If the tractor is to be driven with permanently engaged four-wheel drive, both the passages 46 and 48 are connected to drain as shown in FIGS. 3A and 3B, representing respectively forward and rearward drive. Neither of the passages 46 and 48 is under pressure and regardless of which of these passages is connected to the working chamber 50 by the rotary valve 35, the working chamber 50 will not be under pressure. Consequently, whatever the position of the rotary valve 35, and therefore regardless of whether effectively slip is experienced or not, the chamber 50 is not pressurized. As a result, the spring 28 will act to move the driven member 26 into its left hand end position (with reference to FIGS. 1 and 2) for engagement between the teeth 22 and 24. Torque will therefore be transmitted from the gear 14 to the driven member 26 through the teeth 22, 24, from the driven member 26 to the collar 34 by the splines 36 and from the collar 34 to the driven shaft 16 through the teeth 38, 40. Such permanent four-wheel drive will normally be engaged in off-road conditions in which the rear wheels mostly will tend to slip and therefore will be turning faster than the front wheels so that the lost motion between the teeth 22 and 24 will permanently be taken up in the direction of transmitting torque from the rear wheels to the front wheels.

Figure 4A:
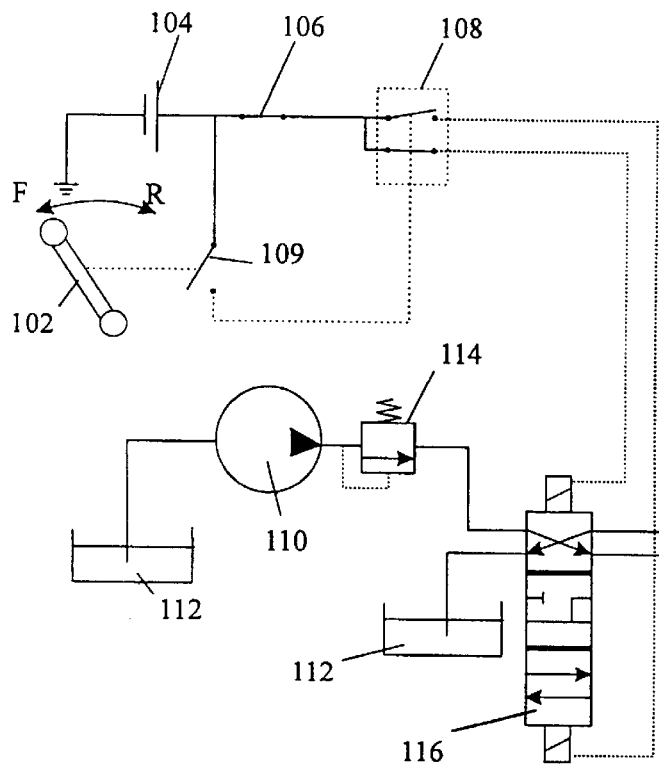
FIG. 4A shows the hydraulic circuit in automatic selection mode when being driven forwards and the front wheels turn faster than the rear wheels.
Figure 5A:
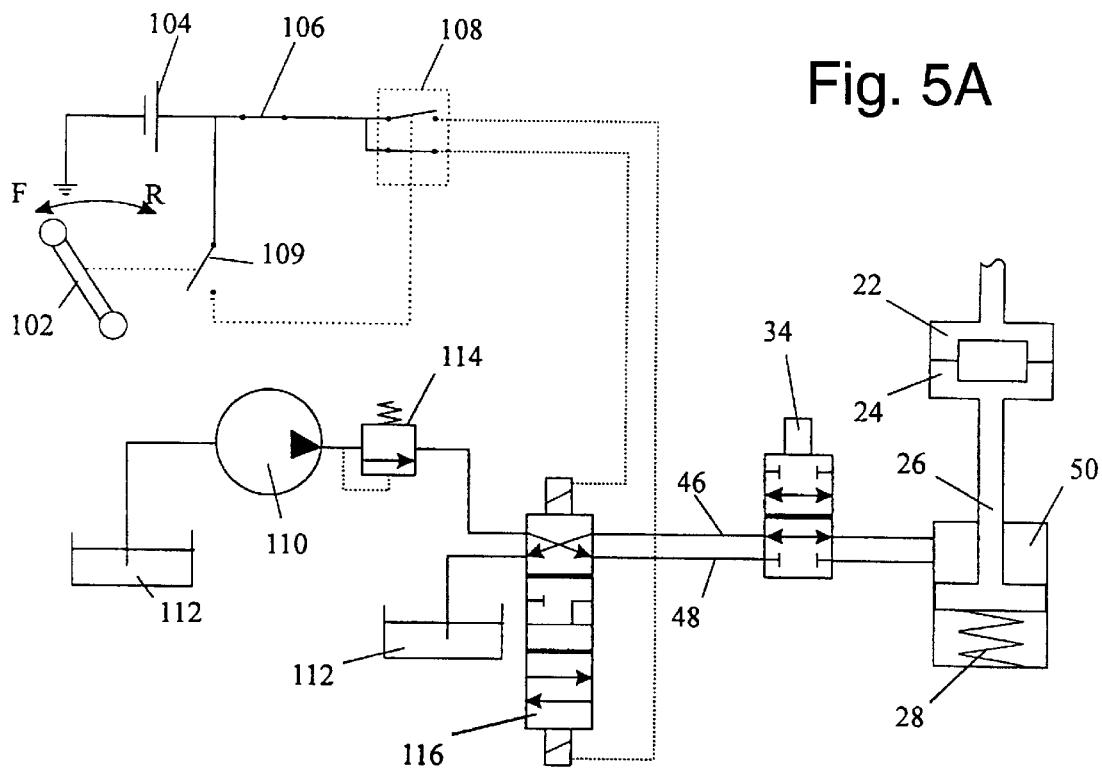
FIG. 5A shows the hydraulic circuit in automatic selection mode when being driven forwards and the rear wheels are slipping on the ground.

If the tractor is to be driven with, automatic mode selection, between two-wheel and four-wheel drive, then the switch 106 is closed. When the tractor is driven forwards, as represented by FIGS. 4A and 5A, then the passage 48 is connected to the hydraulic pressure supply while the passage 46 is connected to drain. Let it first be assumed that the teeth 22 and 24 are engaged in the same manner as previously described for the permanently engaged four-wheel drive with the working chamber 50 relieved by virtue of being connected through one of the ports 52 in the collar 34 to the passage 46. Then for as long as the rear wheels rotate faster than the front wheels, indicating that the tractor is being driven under slip conditions, this condition will be maintained and torque will be transmitted to all four wheels in the manner previously described. Throughout this time, the rotary valve 35 will be in the position shown in FIG. 5A, whereby the chamber 50 is connected to drain through the passage 46. This position corresponds to the condition as shown in FIGS. 6B and 7B.

If the tractor now is driven onto a metalled road surface affording a good grip to all four road wheels whereby slip of the rear wheels no longer occurs, then the friction between the front wheels and the ground will attempt to drive them at a higher speed than that at which they are driven by the engine. The front wheels will attempt to drive the engine in overrunning mode and will apply a torque through the coupling 100 to increase the speed of the engine. As the direction of the torque through the coupling is reversed, the lost motion between the teeth 38, 40 will now be taken up in the opposite direction and the angular position of the collar 34 relative to the driven shaft 16 will change (position as shown in FIG. 6A), so that the rotary valve moves from the position shown in FIG. 5A to that shown in FIG. 4A (position corresponding to FIG. 7A). The working chamber 50 is now connected to the pressure supply through the passage 48 and the expansion of the working chamber 50 will move the driven member 26 against the action of the spring 28, at the same time disengaging the drive between the gear 14 and the driven member 26, as shown in FIG. 4A. Such disengagement will also occur automatically when the tractor is steered in the one or other direction because the front wheels will move over a larger turning radius than the rear wheels. As such, they will be required to cover a longer distance and therefore will rotate faster.

Should the tractor again be driven in conditions where there is considerable wheel slip, requiring a return to four-wheel drive, then the collar 34 will again be driven through the slipping clutch constituted by the spring 42 faster than the driven shaft 16 to take up the free play between the teeth 38 and 40 and return the rotary valve 35 to the position represented in FIG. 5A. The working chamber 50 will therefore again be connected to the drain passage 46, to allow the driven member 26 to be moved by the spring 28 to its left hand end position (with reference to FIGS. 1 and 2) to reengage the teeth 22 and 24 and return to four-wheel drive.

Figure 4B:
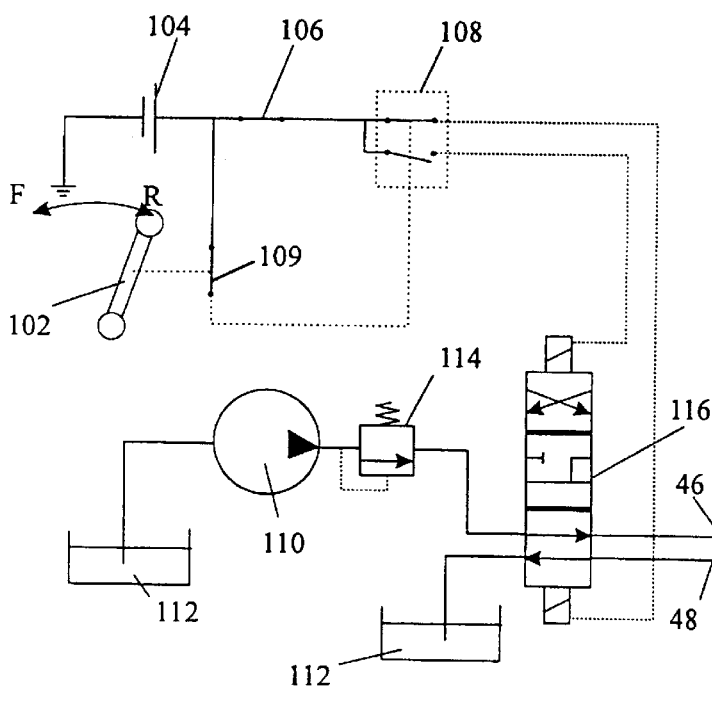
FIG. 4B shows the hydraulic circuit in automatic selection mode when being driven in reverse and the front wheels turn faster than the rear wheels.
Figure 5B:
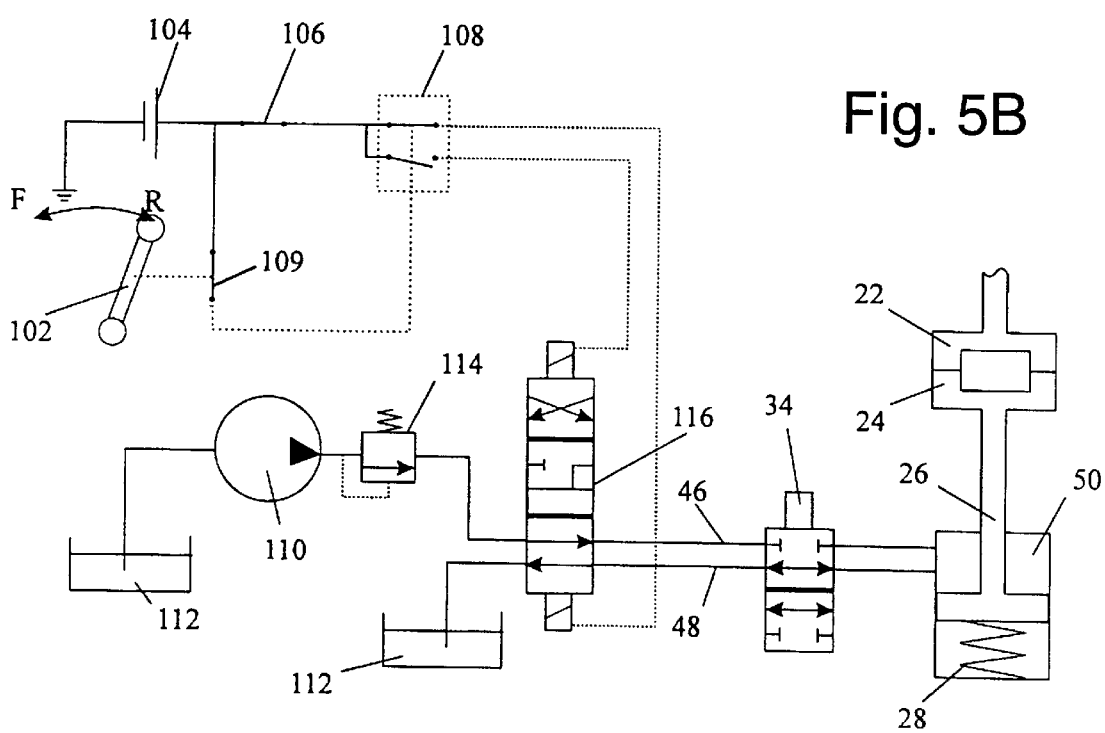
FIG. 5B shows the hydraulic circuit in automatic selection mode when being driven in reverse and the rear wheels are slipping on the ground.

The automatic selection of two and four-wheel drive when the tractor is in reverse takes place in a completely analogous manner to that already described apart from the need to reverse the hydraulic connections to the passages 46 and 48, which is effected by the switch 109 and the relay 108 acting on the solenoids of the valve 116 to move its valve spool from the position shown in FIGS. 4A and 5A to the position shown in FIGS. 4B and 5B. It indeed will be appreciated that in reverse drive, the components shown in FIGS. 6A and 6B are rotating in the anti-clockwise direction. As such, the position of the collar 34 and the driven shaft 16 in FIG. 6A now correspond to the rear wheel slip condition whereby the collar 34 is driven faster than the driven shaft 16. FIG. 6B on the other hand now corresponds to the non-slip condition whereby the driven shaft 16 is attempting to rotate faster than the collar 34. It thus is seen that when changing from forward to rearward drive, the function of FIGS. 6A and 6B is reversed. This also means that the function of FIGS. 7A and 7B is reversed whereby it hence is necessary to shift the valve 116 from one extreme position to the other when the drive direction is reversed so as to reverse the function of the passages 46 and 48.

The coupling 100 thus acts as a means of automatic mode selection in dependence upon wheel slip which can be overridden by varying the pressures applied to the passages 46 and 48, to engage or disengage four-wheel drive. For example, if the tractor is sensed to be on a severe incline, then it is desirable to engage four-wheel drive regardless of the relative speed of the front and rear wheels and this can be achieved by connecting both the passages 46 and 48 to drain by opening the switch 106.

Although not shown in the drawings, it further is possible to install an additional two-position valve inbetween the pressure regular 114 and the drain 112 on the one hand and the valve 116 on the other hand enabling permanent two-wheel drive if so desired. In one position of the additional valve, both inlet ports of valve 116 would be pressurized through the regulator 114 whereby the chamber 50 permanently would be under pressure and hence the teeth 22 and 24 never would become engaged.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a transmission for a vehicle having a first permanently engaged axle and a second selectively engaged axle, the transmission comprising a coupling for selectively applying torque to the second axle of the vehicle to switch between two-wheel drive and four-wheel drive in dependence upon slipping of the wheels connected to the first axle, which coupling includes a first member and a second member arranged to rotate with the first and second axle, respectively, the first and second members having teeth which selectively mesh with one another, the improvement comprising:

said second member including a rotary fluid valve which includes a collar and friction ring interposed between the driven member and the driven shaft and being movable into a position which is sensitive to slip of the wheels connected to the first axle, and jacking means for enabling and disabling the transmission of drive torque through the coupling by respectively engaging and disengaging the teeth, said rotary fluid valve including an angular lost motion coupling controlling the operation of said jacking means for hydraulically engaging a driving connection to said second axle in response to the slip of the wheels of said first axle.

2. The transmission of claim 1 wherein the first and second axle are operatively connected to the rear and front wheels, respectively, of the vehicle.

3. The transmission of claim 2 wherein said first member is a drive member rotatable with the rear wheels and said second member is a driven member rotatable with the front wheels, the drive and driven members being movable axially relative to one another by said jacking means.

4. The transmission of claim 3 wherein the teeth are engaged to transmit torque from the drive to the driven member when said drive and driven members are in a first relative axial position and the teeth are disengaged from one another to disconnect the drive to the front wheels when said drive and driven members are in a second relative axial position.

5. The transmission of claim 4 wherein the rotary fluid valve includes a collar interposed between the driven member and a driven shaft connected to the front axle of the vehicle, said driven member being rotatable with and axially slidable relative to the collar by means of splines, said collar being fixed axially with the driven shaft while being rotatable relative thereto through a limited angle to define said lost motion coupling.

6. The transmission of claim 5 wherein a spring surrounding the driven member acts between a shoulder on the driven member and an abutment plate, which is prevented from moving relative to the collar, to axially bias the driven member towards the drive member for engaging the teeth with one another.

7. The transmission of claim 6 wherein said angular lost motion connection between the collar and the driven shaft is constituted by a plurality of inwardly extending teeth on the collar cooperating under a significant free play with a same plurality of outwardly extending teeth on the driven shaft.

8. The transmission of claim 7 wherein a friction ring is provided for applying frictional drive between the drive member and the collar.

9. The transmission of claim 8 wherein the driven shaft comprises supply and return fluid passages passing therethrough and said collar includes ports which selectively align with the passages in the driven shaft only in predetermined angular positions of the collar relative to the driven shaft to establish fluid communication between the jacking means and the supply or return fluid passages in the driven shaft, the jacking means being in permanent communication with said ports.

10. The transmission of claim 9 wherein the jacking means comprises a pressure chamber defined between the driven member and the collar.

11. The transmission of claim 6 wherein the pressure chamber, when pressurized, is operable to axially move the driven member out of engagement with the drive member against the biasing action of the spring.

12. The transmission of claim 11 wherein the pressure chamber is connected to one of the passages when the free play between the inwardly extending teeth and the outwardly extending teeth is taken up in one direction of rotation, and the pressure chamber is connected to the other one of the passages when the free play is taken up in the other direction of rotation.

13. The transmission of claim 12 wherein the pressure chamber is connected to one of the passages in such a manner as to depressurize said chamber under the condition where the drive member is rotating faster than the driven member, whereby the driven member becomes engaged with the drive member.

14. The transmission of claim 13 wherein the pressure chamber is connected to one of the passages in such a manner as to pressurize said chamber under the condition where the drive member is rotating slower than the driven member, whereby the driven member becomes disengaged from the drive member.

15. The transmission of claim 14 wherein a hydraulic valve is provided for selectably connecting either one of the passages in the driven shaft to either one of a pressure supply and a drain.

16. The transmission of claim 15 wherein the hydraulic valve is a three position, four port solenoid operated valve.

17. In a transmission for a vehicle having a first permanently engaged axle and a second selectively engaged axle, the transmission comprising a coupling for selectively applying torque to the second axle of the vehicle to switch between two-wheel drive and four-wheel drive in dependence upon slipping of the wheels connected to the first axle, which coupling includes a first member and a second member arranged to rotate with the first and second axle, respectively the first and second members having teeth which selectively mesh with one another, the improvement comprising:

said second member including a rotary fluid valve being movable into a position which is sensitive to slip of the wheels connected to the first axle, and jacking means for enabling and disabling the transmission of drive torque through the coupling by respectively engaging and disengaging the teeth, said rotary fluid valve controlling the operation of said jacking means, which includes a pressure chamber defined between a driven shaft and a collar;

a pair of passages formed in said driven shaft in flow communication with said pressure chamber;

a hydraulic valve for selectable connecting either one of the passages in the driven shaft to either one of a pressure supply and a drain; and reversing means for reversing the connections from the pressure supply and the drain to the passages in the driven shaft in dependence upon the direction of movement of the vehicle.

18. The transmission of claim 17 wherein connecting means are provided for connecting both the supply and return fluid passages to drain to enable selection of permanently engaged four-wheel drive.

19. The transmission of claim 18 wherein sending means are provided for sensing the inclination of the vehicle and engaging permanent four-wheel drive when the vehicle is on a steep incline.

* * * * *